United States Patent
Miyauchi et al.

(10) Patent No.: US 7,158,364 B2
(45) Date of Patent: Jan. 2, 2007

(54) MULTILAYER CERAMIC CAPACITOR AND METHOD OF PRODUCING THE SAME

(75) Inventors: Mari Miyauchi, Tokyo (JP); Akira Sato, Tokyo (JP); Kaori Shiozawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/067,715

(22) Filed: Mar. 1, 2005

(65) Prior Publication Data

US 2006/0198078 A1   Sep. 7, 2006

(51) Int. Cl.
 *H01G 4/005*   (2006.01)
 *H01G 4/008*   (2006.01)
 *H01G 4/06*   (2006.01)

(52) U.S. Cl. .................. 361/303; 361/305; 361/311

(58) Field of Classification Search ........ 361/303–305, 361/321.1, 321.2, 321.3, 321.4, 321.5, 311–313
See application file for complete search history.

(56) References Cited

U.S. PATENT DOCUMENTS 4,574,329 A * 3/1986 Eijkelenkamp et al. .. 361/321.2

6,366,444 B1 * 4/2002 Yagi ........................ 361/321.2

FOREIGN PATENT DOCUMENTS

| JP | 04-361513 | * 12/1992 |
| JP | 11-124602 | 5/1999 |
| JP | 11-273995 | * 10/1999 |
| JP | 11-354374 | 12/1999 |
| JP | 2000-232032 | 8/2000 |
| JP | 2002-348603 | 12/2002 |

* cited by examiner

*Primary Examiner*—Eric W. Thomas
(74) *Attorney, Agent, or Firm*—Oblon, Spivak, McClelland, Maier & Neustadt, P.C.

(57) ABSTRACT

The present invention relates to a multilayer ceramic capacitor comprising: an element main body in which a dielectric layer and an inner electrode layer are alternately laminated, the inner electrode layer comprises: a composite structure having an inner electrode main layer of a base metal; and ceramic particles buried in the inner electrode main layer, therefore the inner electrode layer can be prevented from being interrupted by spheroidizing during the forming of the inner electrode layer, that is, drop of an electrode effective area can be inhibited, and high electrostatic capacity is obtained.

15 Claims, 5 Drawing Sheets

MULTILAYER CERAMIC CAPACITOR AND METHOD OF PRODUCING THE SAME

BACKGROUND OF THE INVENTION

1. Field of the Invention

The present invention relates to a multilayer ceramic capacitor, and a method of manufacturing the capacitor.

2. Description of the Related Art

In general, a so-called multilayer ceramic capacitor is manufactured, when dielectric ceramic green sheets prepared beforehand from, for example, an Ni-containing paste constituting an inner electrode layer, and a dielectric layer forming paste constituting a dielectric layer are alternately laminated, and thereafter fired. During the laminating, since there is a demand for a thin multilayered configuration in order to increase electrostatic capacity at an equal volume, there has been a demand for further reduction of thicknesses of an inner electrode layer and a dielectric layer.

During the firing of this laminate, in general, since a dielectric layer forming material (ceramic material) and an inner electrode layer forming material (e.g., Ni) having different firing temperatures are simultaneously fired, a firing temperature is directly raised at a sintering temperature of the dielectric layer forming material.

However, when the inner electrode layer forming material and the dielectric layer forming material are simultaneously fired in this method, the inner electrode layer forming material having the firing temperature lower than that of the dielectric layer forming material is rapidly and excessively sintered at a high firing temperature, and an inner electrode is interrupted by so-called spheroidizing. That is, an infinite number of holes are made every positions in a layered member to be formed into a sheet member, a so-called worm-eaten sheet member (inner electrode layer) is formed. Furthermore, the spheroidizing of the inner electrode is said to induce delamination, and the dielectric layer peels off from the inner electrode layer.

When this spheroidizing occurs, an effective area (electrode coverage) of the inner electrode drops, and the electrostatic capacity of the capacitor is lowered. Therefore, in the present situation, the capacitor needs to be designed in consideration of the drop of the effective area by the interruption of the inner electrode. The drop of the effective area of the inner electrode requires the number of layers to such an extent that the drop is compensated, and this hinders miniaturization and large electrostatic capacity.

To handle this problem, in Japanese Patent Application Laid-Open No. 11-354374, it has been proposed that to form the inner electrode, specifications of the conductive paste be set in such a manner that the paste contains metal powder, and ceramic powder having an average particle diameter of ½ or less of that of the metal powder, and the ceramic powder occupies 2 to 40% by weight of a total solid content. This conductive paste is fired to form the electrode. However, in this proposal, the electrode and dielectric layer are fired under normal conditions, that is, at a firing temperature of 1240° C. in an non-oxidizing atmosphere. Therefore, the ceramic powder cannot remain in the inner electrode layer during or after the firing, and a function of sufficiently preventing the drop of the effective area of the inner electrode cannot be exerted. That is, in Patent Document 1 described above, the ceramic powder in the inner electrode forming conductive paste is gradually discharged on the side of a ceramic layer (dielectric layer) (paragraph [0022]).

Moreover, in Japanese Patent Application Laid-Open No. 2000-232032, particles for forming the inner electrode be used as an integrated particulate material of nickel and titanate to prevent a contraction difference accompanying the sintering of the dielectric layer and inner electrode. However, even in this case, it is said that the drop of the electrode effective area cannot be sufficiently prevented on normally performed firing conditions. An extra step of stably manufacturing the integrated particulate material of nickel and titanate is also required.

Furthermore, it is proposed in Japanese Patent Application Laid-Open Nos. 11-124602 and 2002-348603 that Ni metal particles be coated with a material having a high sintering temperature. Accordingly, a sintering start temperature is shifted toward a high temperature side, the temperature is brought close to the sintering temperature of the dielectric layer, and the electrode is inhibited from being spheroidized. However, in this proposal, even when the sintering temperature of the inner electrode can be shifted toward the high temperature, the material applied/added for the shifting toward the high temperature is diffuses into the dielectric layer at the time of the sintering of the dielectric layer. A problem occurs that composition of the dielectric layer changes, and original characteristics cannot be obtained especially in a case where the dielectric layer is thin. Even when the material applied/added for the shifting toward the high temperature has the same composition as that of the dielectric layer, the material diffuses toward the dielectric layer at the time of the sintering of a dielectric article. A problem remains that the compactness of the inner electrode layer is lost, and the inner electrode is interrupted.

The present invention has been developed under this situation, and an object is to provide a multilayer ceramic capacitor capable of inhibiting spheroidizing during forming of an inner electrode layer to prevent the inner electrode layer from being interrupted, that is, preventing drop of effective area of an inner electrode to obtain a high electrostatic capacity.

SUMMARY OF THE INVENTION

To solve the above-described problem, as a result of intensive researches advanced by the present inventors concerning a structure of an inner electrode and firing conditions of a chip laminate in order to prevent spheroidizing during forming of an inner electrode layer, it has been confirmed that the spheroidizing of the inner electrode layer is inhibited in a case where a predetermined inner electrode structure can be realized, and electrode coverage is remarkably enhanced. Then, the inventors have reached the present invention. Furthermore, it has been confirmed that the predetermined inner electrode structure can be remarkably realized on specific firing conditions, and the present invention has been developed.

That is, according to the present invention, there is provided a multilayer ceramic capacitor comprising: an element main body in which a dielectric layer and an inner electrode layer are alternately laminated, and the inner electrode layer comprises: a composite structure having an inner electrode main layer of a base metal; and ceramic particles buried in the inner electrode main layer.

Moreover, according to a preferable mode of the present invention, a content of ceramic particles buried in the inner electrode main layer is in a range of 1.0 to 20% in terms of a sectional area.

Furthermore, according to a preferable mode of the present invention, an average particle diameter of the buried ceramic particles is ⅔ or less (which does not include zero) of thickness of the inner electrode layer.

Additionally, according to the present invention, there is provided a method of manufacturing a multilayer ceramic capacitor having an element main body in which a dielectric layer and an inner electrode layer are alternately laminated, the method comprising: a step of preparing a dielectric layer forming paste for forming the dielectric layer; a step of preparing an inner electrode forming paste for forming an inner electrode; a step of forming a chip laminate which is a work in process of the element main body using the dielectric layer forming paste and the inner electrode forming paste; and a firing step of firing the chip laminate, the inner electrode forming paste containing base metal particles for forming an inner electrode main layer which functions as an electrode, and ceramic particles, the step of firing the chip laminate comprising: a first firing step performed at a firing temperature of 200 to 1000° C.; and a second firing step performed at a firing temperature higher than that of the first firing temperature after the first firing step.

Moreover, according to a preferable mode of the present invention, the content of the ceramic particles in the inner electrode forming paste is in a range of 0.1 to 40 wt % in conversion into a solid content with respect to that of a base metal.

Furthermore, according to a preferable mode of the present invention, an average particle diameter of the base metal particles contained in the inner electrode forming paste is 0.4 μm or less (which does not include zero), and an average particle diameter of the ceramic particles is 0.1 μm or less (which does not include zero).

Additionally, according to a preferable mode of the present invention, the first forming step is performed in order to fire/form the inner electrode layer while confining the ceramic particles added mainly to the inner electrode forming paste inside the inner electrode layer, and the second firing step is performed in order to fire/form the dielectric layer while confining mainly the ceramic particles inside the inner electrode layer.

Moreover, according to a preferable mode of the present invention, the first firing step is performed in a reduction atmosphere.

DETAILED DESCRIPTION OF THE INVENTION

An embodiment of the present invention will be described hereinafter.

Figure 1:
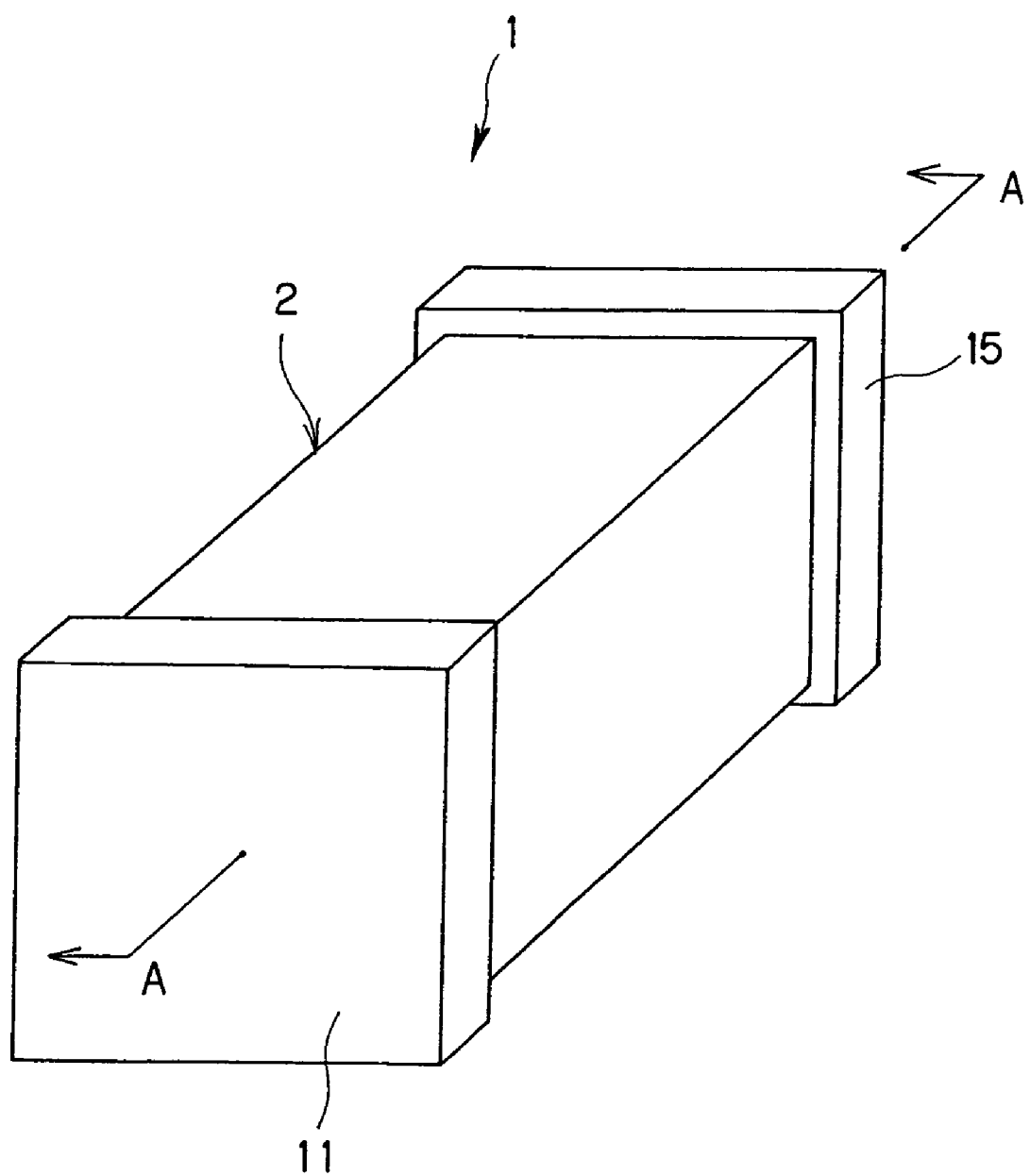
FIG. 1 is a perspective view showing one embodiment of a multilayer ceramic capacitor.

First, a schematic constitution of a general multilayer ceramic capacitor which is an object of the present invention will be described with reference to FIGS. 1 to 3 before description of a main part of the present invention. FIG. 1 is a perspective view showing one embodiment of a multilayer ceramic capacitor, FIG. 2 is a sectional view of the multilayer ceramic capacitor as viewed from arrows A—A shown in FIG. 1, and FIG. 3 is a perspective view showing a process for forming a laminated structure for ease of understanding.

Figure 2:
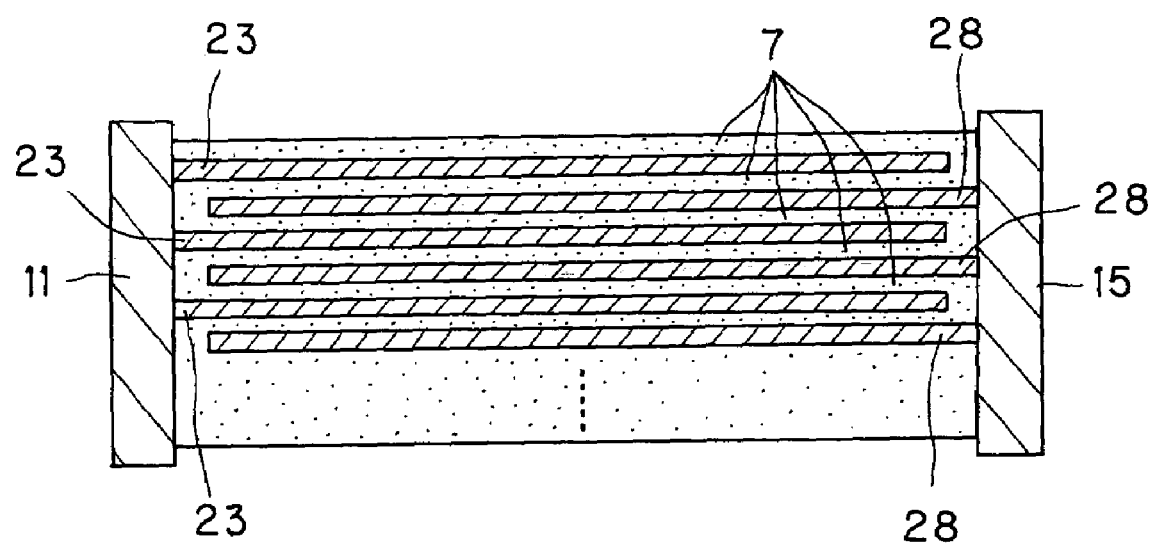
FIG. 2 is a sectional view of the multilayer ceramic capacitor as viewed from arrows A—A shown in FIG. 1.
Figure 3:
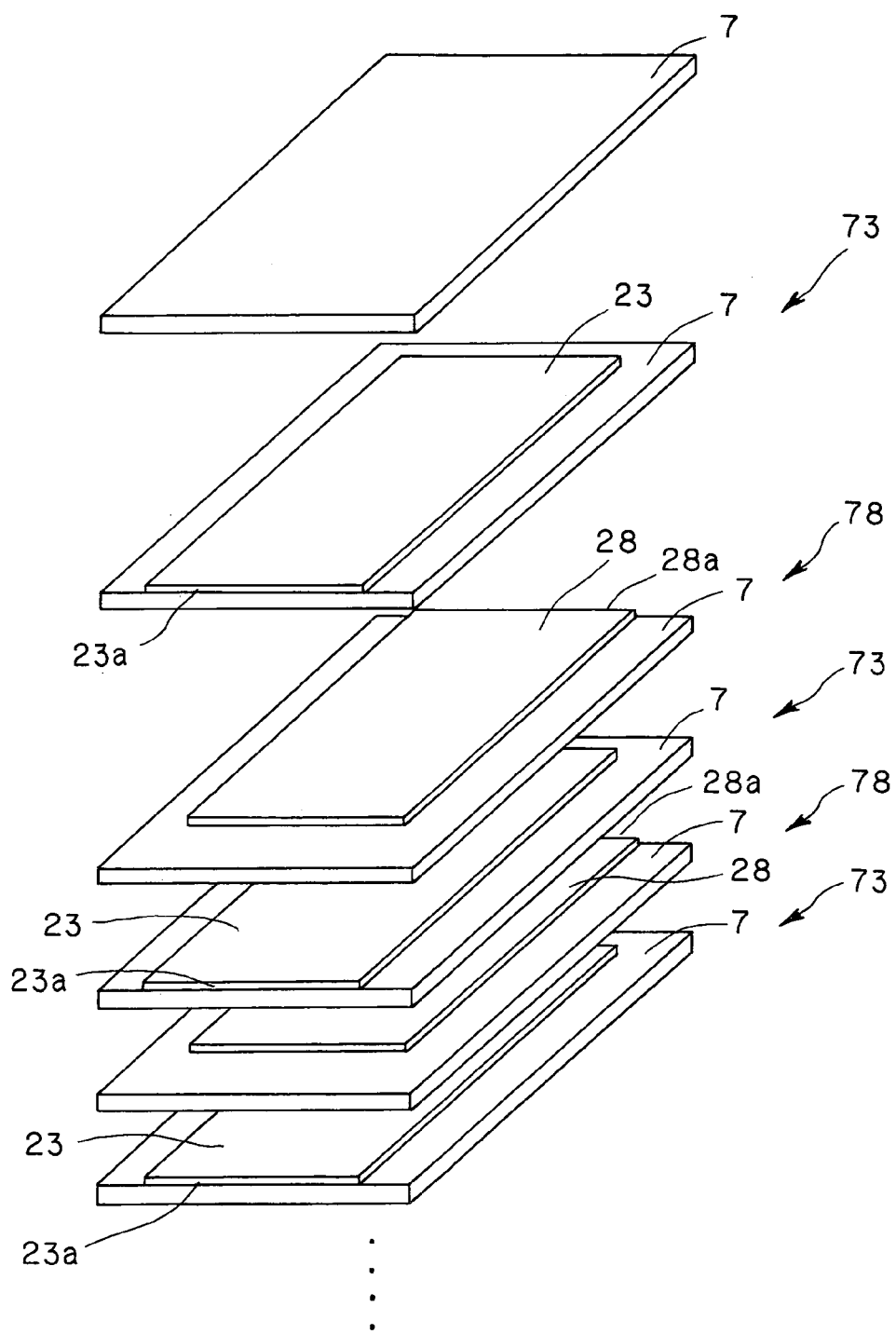
FIG. 3 is a perspective view showing a process for forming a laminated structure for ease of understanding.

As shown in FIGS. 1 to 3, a multilayer ceramic capacitor 1 of the present invention comprises an element main body 2 in which first inner electrode layers 23 and second inner electrode layers 28 are alternately laminated via dielectric layers 7, and a pair of outer electrodes 11, 15 disposed on facing end faces of the element main body 2. The element main body 2 usually has a rectangular parallelepiped shape, but the shape is not especially limited. A dimension of the element main body 2 is not especially limited, and can be appropriately set in accordance with application. For example, the dimension can be set to a size of about (0.6 to 5.6 mm)×(0.3 to 5.0 mm)×(0.3 to 2.5 mm).

The inner electrode layers 23, 28 in the present invention comprise the first inner electrode layers 23 and the second inner electrode layers 28 alternately laminated via the dielectric layers 7 as described above. A preferable example for forming this structure is shown in FIG. 3, and according to the figure, sheet members 73 having the dielectric layers 7 and the first inner electrode layers 23 and sheet members 78 having the dielectric layers 7 and the second inner electrode layers 28 are mutually, successively, and repeatedly laminated into multiple layers.

As shown in FIG. 3, the first inner electrode layer 23 to be laminated has a connection portion 23a exposed on the side of the first outer electrode 11, and the connection portion 23a is connected to the first outer electrode 11. As shown in FIG. 3, in the first inner electrode layer 23, a portion exposed from an outer peripheral frame of the dielectric layer 7 is the only connection portion 23a (more correctly, an only end portion of the connection portion) in relation to the dielectric layer 7.

On the other hand, as shown in FIG. 3, the second inner electrode layer 28 to be laminated has a connection portion 28a exposed on the side of the second outer electrode 15, and the connection portion 28a is connected to the second outer electrode 15. As shown in FIG. 3, in the second inner electrode layer 28, a portion exposed from an outer peripheral frame of the dielectric layer 7 is the only connection portion 28a (more correctly, an only end portion of the connection portion 28a) in relation to the dielectric layer 7.

It is to be noted that in the present invention, the first inner electrode layer 23 and the second inner electrode layer 28 are sometimes combined and referred to as "inner electrode layers 23, 28".

Figure 4:
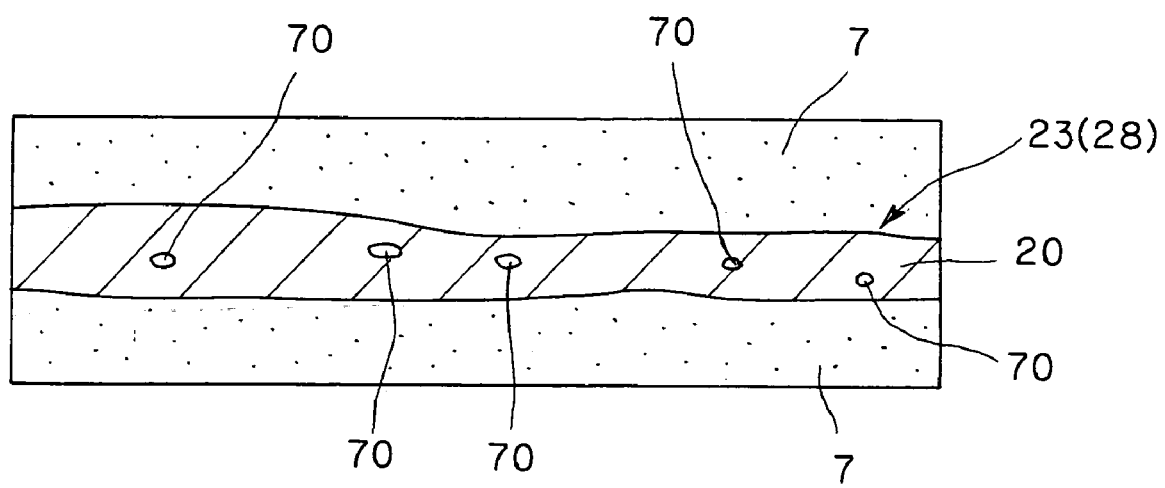
FIG. 4 is a schematic enlarged diagram of a part of an inner electrode layer in a sectional view of FIG. 2.

A main part in the multilayer ceramic capacitor 1 of the present invention will be described with reference to a schematic sectional view of the inner electrode layers 23, 28 in FIG. 4. FIG. 4 is a schematic enlarged diagram of a part of the inner electrode layer in a sectional view of FIG. 2.

In FIG. 4, the inner electrode layer 23 (28) of the present invention comprises a composite structure having an inner electrode main layer 20 of a base metal, and ceramic particles 70 buried in this inner electrode main layer. The inner electrode main layer 20 of the base metal is a main component for exerting an essential function of the inner electrode layer, and occupies a large part of a solid content in the average particle diameter paste. The paste usually contains the layer in the form of a particulate material of the base metal.

An occupying ratio indicated by a sectional area of the ceramic particles 70 buried in the inner electrode main layer 20 is 1.0 to 20%, more preferably 1.5 to 18%, further preferably 2.0 to 10%. When this value is less than 1.0%, a disadvantage is generated that a spheroidizing inhibiting effect of the inner electrode layer of Ni or the like by the ceramic particles is not sufficiently fulfilled. When this value exceeds 20%, a disadvantage is caused that continuity of the inner electrode layer is lost, and an effective area drops in the same manner as in interruption.

As to the "content indicated by the sectional area" described in the present invention, a multilayer ceramic capacitor is cut by a plane vertical to a flat face of the inner electrode layer as described later. The cut face is enlarged at 5000 times by a scanning electron microscope (SEM), and observed. A ratio of the ceramic particles buried inside the inner electrode layer is calculated into an area ratio from an image to obtain the content (average value). In other words, the content is a numerical value indicating a percentage of a total area of the ceramic particles observed in a predetermined section with respect to the electrode area.

In the present invention, the average particle diameter of the buried ceramic particles is set to ⅔ or less (which does not include zero) of thickness of the inner electrode layer. When this value exceeds ⅔, a disadvantage is caused that continuity of the inner electrode layer is lost, and an effective area drops in the same manner as in interruption. A lower limit value of this value is not zero. However, since the ceramic particles for use are remarkably fine particulates having an average particle diameter by the unit of Å or nm, numerical value indication of a lower limit is a value close to zero without any limit. Examples of the lower limit value forcibly include about 1/10000.

Materials of constituting members constituting the multilayer ceramic capacitor 1 will be described hereinafter.

[Inner Electrode Layers 23, 28]

The inner electrode layers 23, 28 in the present invention form the composite structure having the inner electrode main layer 20 of the base metal, and the ceramic particles 70 buried in the inner electrode main layer 20 as described above. The respective members will be described hereinafter.

Inner Electrode Main Layer 20

The layer comprises a conductive material of the base metal which substantially functions as an electrode. Specifically, Ni or an Ni alloy is preferable. As the Ni alloy, an alloy of one or more of Mn, Cr, Co, Al, W and the like with Ni is preferable, and an Ni content in the alloy is preferably 95% by weight or more. Ni or Ni alloy may contain 0.1% by weight or less of various micro-amount components such as P, C, Nb, Fe, Cl, B, Li, Na, K, F, S and the like. The average particle diameter of the base material contained in the paste before the firing is 0.4 µm or less, especially preferably 0.01 to 0.2 µm. This can realize a much thinned layer.

The thickness of the inner electrode layer (inner electrode main layer) can be appropriately set in accordance with the application of the multilayer ceramic capacitor, and is, for example, 0.5 to 5 µm, especially about 0.5 to 2.5 µm.

Ceramic Particles 70

The ceramic particles 70 are not especially limited as long as a function of developing the effect of the present invention is produced. Considering that the particles are moved and taken on the side of the dielectric layer at a certain ratio during the firing, the particles preferably comprise the same material as a main material constituting the dielectric layer 7, or additive elements.

Specifically, a dielectric material for use in the dielectric layer, for example, a titanium oxide-based material, titanate-based complex oxide, or a mixture of them may be used.

Examples of titanium oxide-based material include $TiO_2$ and the like containing NiO, CuO, $Mn_3O_4$, $Al_2O_3$, MgO, $SiO_2$ or the like by a total amount in a range of 0.001 to 30% by weight as being occasionally demanded.

Moreover, examples of titanate-based complex oxide include barium titanate ($BaTiO_3$) and the like. An atom ratio of Ba/Ti is preferably in a range of 0.95 to 1.20. Barium titanate may contain MgO, CaO, $Mn_3O_4$, $Y_2O_3$, $V_2O_5$, ZnO, $ZrO_2$, $Nb_2O_5$, $Cr_2O_3$, $Fe_2O_3$, $P_2O_5$, SrO, $Na_2O$, $K_2O$, $Li_2O$, $SiO_2$, $WO_3$ or the like by a total amount in a range of about 0.001 to 30% by weight.

Additionally, the particles may be ceramic particles comprising an oxide compound of a combination of one or two or more of Ba, Ca, Sr, Ti, Zr, Mg, Mn, V, Y, Cr, Nb, Si, K, Na, Li, B, Sc, Hf, Al, W, lanthanoid-based material (La, Ce, Pr, Nd, Sm, Eu, Gd, Tb, Dy, Ho, Er, Tm, Yb, Lu) and the like.

A particle diameter of ceramic particles is not especially limited as long as the particles are completely buried in the electrode layer, but an average particle diameter is set to 0.1 µm or less (which does not include zero) in such a manner as to handle a thin layer. Since the ceramic particles for use are remarkably fine particulates having an average particle diameter by a unit of nm, a lower limit numerical value indication is set to a value (e.g., about 20 nm) close to zero without limit.

[Dielectric Layer 7]

A dielectric material for use in a dielectric layer constituting the multilayer ceramic capacitor 1 of the present invention is not especially limited, and various dielectric materials are usable. For example, a titanium oxide-based material, titanate-based complex oxide, a mixture of them or the like is usable.

Examples of titanium oxide-based material include $TiO_2$ and the like containing NiO, CuO, $Mn_3O_4$, $Al_2O_3$, MgO, $SiO_2$ or the like by a total amount in a range of 0.001 to 30% by weight as being occasionally demanded.

Moreover, examples of titanate-based complex oxide include barium titanate ($BaTiO_3$) and the like. An atom ratio of Ba/Ti is preferably in a range of 0.95 to 1.20. Barium titanate may contain MgO, CaO, $Mn_3O_4$, $Y_2O_3$, $V_2O_5$, ZnO, $ZrO_2$, $Nb_2O_5$, $Cr_2O_3$, $Fe_2O_3$, $P_2O_5$, SrO, $Na_2O$, $K_2O$, $Li_2O$, $SiO_2$, $WO_3$ or the like by a total amount in a range of about 0.001 to 30% by weight.

Additionally, an oxide compound of a combination of one or two or more of Ba, Ca, Sr, Ti, Zr, La, Mg, Mn, V, Y, Cr, Nb, Si, K, Na, Li, B, Sc, Hf, Al, Ce, Pr, Nd, Sm, Eu, Gd, Tb, Dy, Ho, Er, Tm, Yb, Lu, W, and the like may be used as a dielectric material. The examples include (Ca, Sr) (Ti, Zr) $O_3$ (CaSr/TiZr ratio 0.6 to 1.2). This material may contain Ba, La, Mg, Mn, V, Y, Cr, Nb, Si, K, Na, Li, B, Sc, Hf, Al, Ce, Pr, Nd, Sm, Eu, Gd, Tb, Dy, Ho, Er, Tm, Yb, Lu, W in a range of about 0.001 to 30% by weight if necessary.

Moreover, to adjust a firing temperature, linear expansion coefficient or the like, glass such as $SiO_2$ and $SiO_2$ compound with Ba, Ca, Sr, Ti, Zr, La, Mg, Mn, V, Y, Cr, Nb, Si, K, Na, Li, B, Sc, Hf, Al may be contained.

Thickness per dielectric layer is not especially limited, but can be set to, for example, about 0.5 to 20 µm. The number of dielectric layers can be usually set to about 2 to 300.

[Outer Electrodes 11, 15]

In the outer electrodes 11, 15 constituting a complex electronic component of the present invention, at least one of metals such as Pd, Ag, Au, Cu, Pt, Rh, Ru, Ir, or an alloy of them may be used as a conductive material. Thickness of the outer electrode is not especially limited, and can be set to, for example, about 1 to 100 µm, especially 5 to 50 µm.

Moreover, the outer electrode may contain glass for a purpose of enhancing sinterability of the conductive material, and securing adhesion to a laminate.

Method of Manufacturing Multilayer Ceramic Capacitor

Next, a method of manufacturing a multilayer ceramic capacitor of the present invention will be described.

First, dielectric layers and inner electrode layers are alternately laminated by a usual printing process or sheet process using a paste to form a prototype (laminate) of an element main body. Next, outer electrodes are formed on opposite end faces of the laminate on an outer electrode side by printing, transferring, bonding, dipping or the like. Thereafter, the laminate can be fired to manufacture the multilayer ceramic capacitor. Details of each manufacturing step will be successively described as the following (1) to (5).

(1) Preparation of Chip Laminate (Element Main Body)

When a so-called printing process is used, a dielectric layer forming paste and an inner electrode layer forming paste are successively laminated/printed on a support member of polyethylene terephthalate. At this time, a first outer electrode layer 11 and a second outer electrode layer 15 are printed in such a manner as to obtain a predetermined mode with respect to an outer frame of the dielectric layer forming paste. The dielectric layer and the inner electrode layer are successively laminated/printed, cut and chipped into predetermined shapes, and thereafter peeled from the support member to form the chip laminate (prototype of an element main body).

Moreover, when a so-called sheet process is used, a plurality of dielectric green sheets are formed using a dielectric layer forming paste. The inner electrode layer forming paste is applied onto the green sheets, and sheet members 73, 78 are formed as shown in FIG. 3. They are successively laminated, subjected to a predetermined heating and pressurizing operation, and thereafter cut into predetermined shapes to form the chip laminate (prototype of the element main body).

A content of ceramic particles in the inner electrode forming paste is 0.1 to 40 wt %, preferably 10 to 20 wt % in accordance with conversion into a solid content with respect to a solid content of a base metal. When the content is less than 0.1 wt %, contribution ratio to a composite structure drops. On the other hand, when the content exceeds 40 wt %, a disadvantage is caused that continuity of an electrode is lost, and an effective electrode area drops of the capacitor drops.

A composition example of the paste for general use in the above-described step will be described hereinafter.

<Dielectric Layer Forming Paste>

A dielectric material and organic vehicle are kneaded/dispersed, and used as the dielectric layer forming paste.

As to an average particle diameter of the dielectric material, powder having an average particle diameter of about 0.1 to 5 μm is usually used. A content of the dielectric material in the dielectric layer forming paste is usually 30 to 80% by weight.

The organic vehicle for use in the dielectric layer forming paste is a binder dissolved in an organic solvent. As the binder, for example, a known resin binder is used such as ethyl cellulose, copolymer of polyvinyl butyral and ester methacrylate, and ester acrylate-based copolymer. As an organic solvent for dissolving the binder, organic solvents are used such as terpineol, butyl carbitol, acetone, and toluene. The content of the binder or organic solvent in the dielectric layer forming paste is not especially limited, but usually the content of the binder is about 1 to 5% by weight, and the content of the organic solvent is about 10 to 50% by weight.

<Inner Electrode Layer Forming Paste>

The inner electrode layer forming paste is prepared by kneading/dispersing the above-described conductive metal, alloy, ceramic particle, and organic vehicle.

(2) De-binder Process Step

The chip laminate prepared as described above is preferably subjected to a de-binder process before fired. The conditions of the de-binder process can be appropriately set in consideration of used materials and the like. For example, when base metals such as Ni and Ni alloy are used in the conductive material of the inner electrode layer, the step is especially preferably performed on the following conditions.

De-binder Process Conditions

Temperature rise speed: 5 to 300° C./hour, especially 10 to 100° C./time

Retention temperature: 200 to 400° C., especially 250 to 300° C.

Temperature retention time: 0.5 to 24 hours, especially 5 to 20 hours

Atmosphere: in the air (3) Firing Step

The chip laminate in the present invention is fired including at least two stages of firing patterns as follows.

That is, the firing step of the chip laminate comprises a first firing step at firing temperature of 200 to 1000° C. (preferably 500 to 900° C., further preferably 600 to 800° C.), and a second firing step performed after the first firing step. The firing temperature in the second firing step is set to be higher than that in the first firing step.

A preferable firing temperature in the second firing step differs with the type of the dielectric layer or the like.

(1) For example, when the dielectric layer comprises $BaTiO_3$ or $(Ba, Ca)(Ti, Zr)O_3$ as a main component, the second firing temperature is preferably set at 1100 to 1280° C.

(2) When the layer comprises $(Ca, Sr)(Ti, Zr)O_3$ as a main component, the second firing temperature is preferably set at 1100 to 1400° C.

The temperature retention time at the firing time is 1 to 50 hours, especially preferably 2 to 24 hours in the first firing step. The time is 0.5 to 10 hours, especially preferably 1 to 4 hours in the second firing step.

When two stages of firing set within a predetermined temperature range are performed, ceramic particles can form a composite structure buried in the inner electrode (inner electrode main layer). Accordingly, the occurrence of interruption of the inner electrode layer by the spheroidizing during the forming of the inner electrode layer can be remarkably reduced as compared with a conventional method.

The first firing step is preferably performed in a reduction atmosphere. The reduction atmosphere may be formed when circulating, for example, a mixed gas of $N_2$ and 0.5 to 10 vol % of $H_2$ in steam. An oxygen partial pressure is preferably set to $10^{-50}$ to $10^{-5}$ Pa.

When the first firing step is functionally distinguished from the second firing step, the first firing step is performed mainly in order to fire and to form the inner electrode layer while confining the ceramic particle added to the inner electrode forming paste inside the inner electrode layer. The second firing step can be performed mainly in order to fire and to form the dielectric layer while confining the ceramic particles in the inner electrode layer.

(4) Annealing Step

When the laminate is fired in the reduction atmosphere, the fired laminate is preferably annealed. The annealing is a process for oxidizing the dielectric layer again, and acceleration life of insulation resistance can be accordingly remarkably lengthened.

The oxygen partial pressure of the annealing atmosphere is preferably set to $10^{-9}$ Pa or more, especially $10^{-9}$ to 1 Pa. When the oxygen partial pressure is less than the above-described range, it is difficult to oxidize the dielectric layer again. When the oxygen partial pressure exceeds the above-described range, there is a fear that the oxidation of the inner electrode layer proceeds.

The annealing retention temperature is set at 1100° C. or less, especially preferably 500 to 1100° C. When the retention temperature is less than 500° C., re-oxidation of the dielectric layer is insufficient, and the acceleration life of the insulation resistance shortens. When the temperature exceeds 1100° C., the oxidation of the inner electrode layer proceeds, electrostatic capacity drops, further the layer reacts with a dielectric material, and the acceleration life also shortens.

It is to be noted that the annealing step may comprise temperature rise and temperature drop. In this case, a temperature retention time does not have to be taken, and the retention temperature is synonymous with maximum temperature. The temperature retention time is 0 to 20 hours, especially preferably 2 to 10 hours. In an atmosphere gas, $N_2$ and humidified $H_2$ gas are preferably used.

It is to be noted that to humidify mixed gas of $N_2$ and $H_2$ or the like in the above-described de-binder process, firing, and annealing steps, for example, a wetter or the like is usable. Water temperature in this case is preferably about 0 to 75° C.

The de-binder process, firing, and annealing steps may be performed continuously or independently. When these steps are continuously performed, after the de-binder process, the atmosphere is changed without cooling the atmosphere. Subsequently, the temperature is successively raised in two stages at firing retention temperature, the firing is performed, and next the atmosphere is cooled. When the temperature reaches the retention temperature in the annealing step, the atmosphere is preferably changed to perform the annealing.

Moreover, when these steps are performed independently, the de-binder process step is raised at a predetermined retention temperature, the temperature is retained for a predetermined time, and the temperature is lowered at room temperature. In this case, a de-binder atmosphere is set to be similar to that in a case where the steps are continuously performed. Furthermore, in the annealing step, the temperature is raised at the predetermined retention temperature, the temperature is retained for a predetermined time, and the temperature is lowered at room temperature. In this case, the annealing atmosphere is set to be similar to that in a case where the steps are continuously performed. The de-binder step and the firing step are continuously performed, and the only annealing step may be performed independently. Alternatively, the only de-binder step is independently performed, and the firing and annealing steps may be continuously performed.

(5) Outer Electrode Forming Step

An outer electrode forming paste is printed or transferred onto facing opposite end face sides of the chip laminate (prototype of the element main body) prepared as described above. Thereafter, the laminate is fired, and outer electrodes are formed. Alternatively, after the paste is applied by dipping, the laminate is fired, and the electrodes may be formed.

As to conditions for firing the outer electrode paste, for example, the paste is preferably fired in a reduction atmosphere of the mixed gas of $N_2$ and $H_2$ at 600 to 800° C. for about ten minutes to one hour.

<Outer Electrode Forming Paste>

At least one type of metals Pd, Ag, Au, Cu, Pt, Rh, Ru, Ir and the like, or an alloy of them is used as the outer electrode forming paste, and the paste is prepared in the same manner as in the inner electrode layer paste.

It is to be noted that an additive selected from various types of dispersant, plasticizer, dielectric, insulator and the like may be contained in the above-described various pastes. A total content of them is preferably set to 10% by weight or less.

A lead wire is disposed on the multilayer ceramic capacitor of the present invention manufactured as described above as being occasionally demanded, and the capacitor is mounted on a printed board by soldering or the like, and used.

The present invention will be described in more detail in accordance with specific examples.

EXAMPLE 1

Preparation of Dielectric Layer Forming Paste

Ceramic powder containing $BaTiO_3$ having an average particle diameter of 0.2 μm as a main component was prepared as a main material of a dielectric layer. With respect to this main material, 10 wt % of a polyvinyl butylal (PVB) resin was weighed and added as an organic binder. With respect to the main material, 5 wt % of diocutyl phthalate (DOP) was weighed and added as a plasticizer. Thereafter, the materials were kneaded by a ball mill to form a slurry (dielectric layer forming paste).

Preparation of Inner Electrode Layer Forming Paste

Ni particles having an average particle diameter of 0.2 μm were prepared. Ceramic powder (ceramic particles having an average particle diameter of 0.05 μm) having the same composition as that used in the dielectric layer forming paste was added to the Ni particles by 20 wt %. Further with respect to the mixed powder, 5 wt % of ethyl cellulose resin, and 35 wt % of turbineol were weighed and added, and thereafter kneaded with a ball mill to form an inner electrode layer forming paste.

Preparation of Chip Laminate (Prototype of Element Main Body)

A ceramic green sheet (dielectric green sheet) having a thickness of 1.5 μm after dried was prepared using the dielectric layer forming slurry (paste) by a doctor blade process. The inner electrode layer forming paste was applied onto the ceramic green sheet by a screen printing process, and an inner electrode layer pattern having a thickness of 1.8 μm was formed.

Next, ceramic green sheets in which inner electrode layer patterns were not printed were superimposed until a thickness of 300 μm was obtained. Furthermore, five ceramic sheets prepared by printing the inner electrode layer patterns by the above-described procedure were superimposed, further ceramic green sheets in which any electrode pattern was not printed were superimposed until a thickness of 300 μm was obtained, and the sheets were heated and pressurized on conditions at a temperature of 800° C. under a pressure of 1 ton/cm² to obtain a chip laminate having a size of 3.2 mm×1.6 mm×1.0 mm.

De-Binder Step and Firing Step

Next, this chip laminate was left to stand at a temperature of 250° C. for eight hours for a purpose of flying the binder contained in the laminate, so-called de-binder.

Thereafter, the firing (first and second firing steps) of the present invention was performed in a reduction atmosphere, and a multilayer ceramic capacitor comprising an inner electrode layer having a composite structure was obtained. The reduction atmosphere was obtained by passing a mixed gas of $N_2$ and 5 vol % $H_2$ through saturated steam at 30° C. Mainly a first firing step performed in order to confine ceramic particles (conductive particles: co-material) added to the inner electrode forming paste in the inner electrode layer was performed at a firing temperature of 600° C. for a retention time of two hours. A second firing step performed after the first firing step was performed in the same reduction atmosphere at a firing temperature of 1240° C. for a retention time of two hours.

After the first and second firing steps, an annealing step was performed for a purpose of re-oxidation of the dielectric layer. That is, a thermal treatment was performed at 1050° C. in the reduction atmosphere obtained by passing an $N_2$ gas through steam.

A sample of Example 1 of the present invention was prepared in this procedure.

EXAMPLE 2

A sample of Example 2 of the present invention was prepared in the same manner as in Example 1 except that a reduction atmosphere in the first firing step used in Example 1 was changed to a mixed gas of $N_2$ and 0.5 vol % $H_2$ from a mixed gas of $N_2$ and 5 vol % $H_2$.

EXAMPLE 3

A sample of Example 3 of the present invention was prepared in the same manner as in Example 1 except that a firing temperature in a first firing step used in Example 1 was changed to 800° C. from 600° C.

EXAMPLE 4

A sample of Example 4 of the present invention was prepared in the same manner as in Example 1 except that a firing temperature in a first firing step used in Example 1 was changed to 1000° C. from 600° C.

EXAMPLE 5

A sample of Example 5 of the present invention was prepared in the same manner as in Example 1 except that a reduction atmosphere in a first firing step used in Example 1 was changed to a mixed gas of $N_2$ and 0.5 vol % $H_2$ from a mixed gas of $N_2$ and 5 vol % $H_2$. Furthermore, a firing temperature in the first firing step used in Example 1 was changed to 260° C. from 600° C., and a retention time was changed to eight hours from two hours.

EXAMPLE 6

A sample of Example 6 of the present invention was prepared in the same manner as in Example 1 except that a reduction atmosphere in a first firing step used in Example 1 was changed to usual air from a mixed gas of $N_2$ and 5 vol % $H_2$. Furthermore, a firing temperature in the first firing step used in Example 1 was changed to 260° C. from 600° C., and a retention time was changed to eight hours from two hours.

EXAMPLE 7

A sample of Example 7 of the present invention was prepared in the same manner as in Example 1 except that ceramic powder in an inner electrode layer forming paste used in Example 1 was changed to ceramic particles (average particle diameter of 0.05 μm) of $ZrO_2$ from ceramic powder containing $BaTiO_3$ which was a main material of a dielectric layer as a main component.

EXAMPLE 8

A sample of Example 8 of the present invention was prepared in the same manner as in Example 1 except that ceramic powder in an inner electrode layer forming paste used in Example 1 was changed to ceramic particles (average particle diameter of 0.05 μm) of $BaSiO_3$ from ceramic powder containing $BaTiO_3$ which was a main material of a dielectric layer as a main component.

EXAMPLE 9

A sample of Example 9 of the present invention was prepared in the same manner as in Example 1 except that ceramic powder in an inner electrode layer forming paste used in Example 1 was changed to ceramic particles ( average particle diameter of 0.05 μm) of $CaTiO_3$ from ceramic powder containing $BaTiO_3$ which was a main material of a dielectric layer as a main component.

EXAMPLE 10

A sample of Example 10 of the present invention was prepared in the same manner as in Example 1 except that a content of ceramic powder in an inner electrode layer forming paste used in Example 1 was changed to 5 wt % from 20 wt %.

EXAMPLE 11

A sample of Example 11 of the present invention was prepared in the same manner as in Example 1 except that a content of ceramic powder in an inner electrode layer forming paste used in Example 1 was changed to 10 wt % from 20 wt %.

EXAMPLE 12

A sample of Example 12 of the present invention was prepared in the same manner as in Example 1 except that a content of ceramic powder in an inner electrode layer forming paste used in Example 1 was changed to 15 wt % from 20 wt %.

EXAMPLE 13

A sample of Example 13 of the present invention was prepared in the same manner as in Example 1 except that a content of ceramic powder in an inner electrode layer forming paste used in Example 1 was changed to 25 wt % from 20 wt %.

EXAMPLE 14

A sample of Example 14 of the present invention was prepared in the same manner as in Example 1 except that a retention time in a first firing step used in Example 1 was changed to ten hours from two hours.

EXAMPLE 15

A sample of Example 15 of the present invention was prepared in the same manner as in Example 1 except that a firing temperature in a first firing step used in Example 1 was changed to 700° C. from 600° C., a retention time was changed to 20 hours from two hours, and further a firing temperature in a second firing step was changed to 1220° C. from 1240° C.

EXAMPLE 16

A sample of Example 16 of the present invention was prepared in the same manner as in Example 1 except that a retention time in a first firing step used in Example 1 was changed to 20 hours from two hours.

COMPARATIVE EXAMPLE 1

A sample of Comparative Example 1 was prepared in the same manner as in Example 1 except that a first firing step used in Example 1 was omitted, and was not performed, and an only second firing step was performed. This comparative example sample corresponds to Patent Document 1 (Japanese Patent Application Laid-Open No. 11-354374).

COMPARATIVE EXAMPLE 2

A sample of Comparative Example 2 was prepared in the same manner as in Example 1 except that a content of ceramic powder in an inner electrode layer forming paste used in Example 1 was changed to 0 wt % (not added) from 20 wt %.

COMPARATIVE EXAMPLE 3

A sample of Comparative Example 3 was prepared in the same manner as in Example 1 except that a firing temperature in a second firing step used in Example 1 was changed to 1300° C. from 1240° C.

COMPARATIVE EXAMPLE 4

A sample of Comparative Example 4 was prepared in the same manner as in Example 1 except that a firing temperature in a first firing step used in Example 1 was changed to 1080° C. from 600° C.

EXAMPLE 17

A sample of Example 17 was prepared in the same manner as in Example 1 except that a ceramic main component for forming a dielectric layer, used in Example 1, was changed to a $Ca_{0.7}Sr_{0.3}Ti_{0.97}Zr_{0.03}O_3$ material having an average particle diameter of 0.3 µm from a $BaTiO_3$ material having an average particle diameter of 0.2 µm, ceramic powder contained in an inner electrode layer forming paste was changed to ceramic particles (average particle diameter of 0.03 µm) of $Ca_{0.7}Sr_{0.3}Ti_{0.97}Zr_{0.03}O_3$ from ceramic powder containing $BaTiO_3$ as a main component, and further a firing temperature in a second firing step was changed to 1320° C. from 1240° C.

EXAMPLE 18

A sample of Example 18 was prepared in the same manner as in Example 1 except that a ceramic main component for forming a dielectric layer, used in Example 1, was changed to a $Ca_{0.7}Sr_{0.3}Ti_{0.97}Zr_{0.03}O_3$ material having an average particle diameter of 0.3 µm from a $BaTiO_3$ material having an average particle diameter of 0.2 µm, and further a firing temperature in a second firing step was changed to 1320° C. from 1240° C.

EXAMPLE 19

A sample of Example 19 was prepared in the same manner as in Example 1 except that a ceramic main component for forming a dielectric layer, used in Example 1, was changed to a $Ca_{0.7}Sr_{0.3}Ti_{0.97}Zr_{0.03}O_3$ material having an average particle diameter of 0.3 µm from a $BaTiO_3$ material having an average particle diameter of 0.2 µm, ceramic powder contained in an inner electrode layer forming paste was changed to ceramic particles (content of 10 wt %; average particle diameter of 0.05 µm) of $MgTiO_3$ from ceramic powder (content of 20 wt %) containing $BaTiO_3$ as a main component, and further a firing temperature in a second firing step was changed to 1320° C. from 1240° C.

EXAMPLE 20

A sample of Example 20 was prepared in the same manner as in Example 1 except that a ceramic main component for forming a dielectric layer, used in Example 1, was changed to a $Ba_{0.97}Ca_{0.03}Ti_{0.8}Zr_{0.2}O_3$ material having an average particle diameter of 0.3 µm from a $BaTiO_3$ material having an average particle diameter of 0.2 µm, and ceramic powder contained in an inner electrode layer forming paste was changed to ceramic particles (average particle diameter of 0.05 µm) of $Ba_{0.97}Ca_{0.03}Ti_{0.8}Zr_{0.2}O_3$ from ceramic powder containing $BaTiO_3$ as a main component. Furthermore, firing conditions in a first firing step were set to a firing temperature of 600° C., a firing time of two hours, and a firing atmosphere of 3% $H_2$ atmosphere, and firing conditions in a second firing step were set to a firing temperature of 1260° C., a firing time of two hours, and a firing atmosphere of 3% $H_2$ atmosphere.

EXAMPLE 21

A sample of Example 21 was prepared in the same manner as in Example 1 except that a ceramic main component for forming a dielectric layer, used in Example 1, was changed to a $Ba_{0.97}Ca_{0.03}Ti_{0.8}Zr_{0.2}O_3$ material having an average particle diameter of 0.3 µm from a $BaTiO_3$ material having an average particle diameter of 0.2 µm. Furthermore, firing conditions in a first firing step were set to a firing temperature of 600° C., a firing time of two hours, and a firing atmosphere of 3% $H_2$ atmosphere, and firing conditions in a second firing step were set to a firing temperature of 1260° C., a firing time of two hours, and a firing atmosphere of 3% $H_2$ atmosphere.

EXAMPLE 22

A sample of Example 22 was prepared in the same manner as in Example 1 except that a ceramic main component for forming a dielectric layer, used in Example 1, was changed to a $Ba_{0.97}Ca_{0.03}Ti_{0.8}Zr_{0.2}O_3$ material having an average particle diameter of 0.3 μm from a $BaTiO_3$ material having an average particle diameter of 0.2 μm, and ceramic powder contained in an inner electrode layer forming paste was changed to ceramic particles (average particle diameter of 0.05 μm) of $BaSiO_3$ from ceramic powder containing $BaTiO_3$ as a main component. Furthermore, firing conditions in a first firing step were set to a firing temperature of 600° C., a firing time of two hours, and a firing atmosphere of 3% $H_2$ atmosphere, and firing conditions in a second firing step were set to a firing temperature of 1260° C., a firing time of two hours, and a firing atmosphere of 3% $H_2$ atmosphere.

COMPARATIVE EXAMPLE 5

A sample of Comparative Example 5 was prepared in the same manner as in Example 20 except that a first firing step was omitted, and an only second firing step was performed in Example 20.

With respect to the above-described samples, (1) a content indicated by a sectional area of ceramic particles buried in an inner electrode layer, (2) an inner electrode coverage, and (3) electrostatic capacity were measured by the following procedure.

(1) Content Indicated by Sectional Area of Ceramic Particles Buried in Inner Electrode Layer A multilayer ceramic capacitor was cut by a plane vertical to a flat face of an inner electrode layer in three portions (five layers were measured per portion), each cut face was enlarged by 5000 times, and observed in a scanning electron microscope (SEM), and a ratio of ceramic particles buried in an inner electrode layer was calculated as an area ratio from an image to obtain a content (average value).

(2) Inner Electrode Coverage

A presence ratio of an inner electrode layer in the cut face was calculated as an inner electrode coverage X (%) from Equation 1. Ideally, the inner electrode layer has continuity, and must have a predetermined set length L. However, in actual, the inner electrode is interrupted in a plurality of places by so-called spheroidizing, and a total length $\Sigma Li$ of a divided electrode excluding an interrupted portion is an actual length value. To indicate the value for ease of understanding, $(\Sigma Li/L)^2 \times 100$ indicates the inner electrode coverage X(%).

$$X=(\Sigma Li/(N \times L))^2 \times 100 \qquad \text{Equation 1,}$$

where N: the number of electrode layers in a screen; and

L: original length of the electrode layer.

Figure 5:
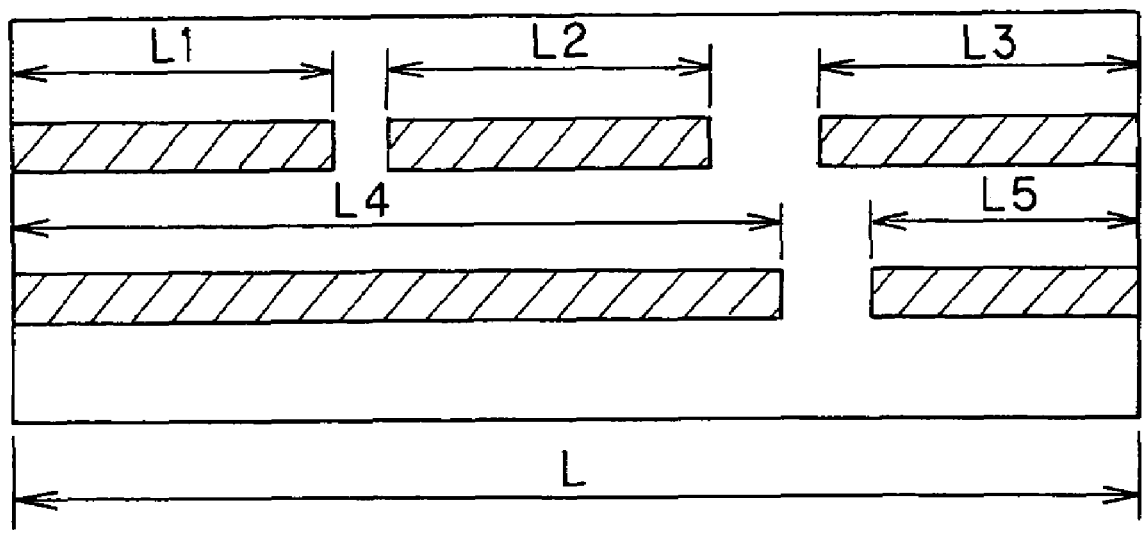
FIG. 5 is a model diagram for facilitating understanding of application of Equation 1 which calculates an inner electrode coverage X (%).

To understand application of Equation 1, refer, for example, to a model diagram of FIG. 5.

When Equation 1 is fitted into the model diagram of FIG. 5, $\Sigma Li=L1+L2+L3+L4+L5$. When the electrode layer comprises two layers, $N \times L=2L$. Therefore, $X=((L1+L2+L3+L4+L5)/2L)^2 \times 100$ is calculated.

(3) Electrostatic Capacity

A capacitor electrostatic capacity was measured at 1 kHz, 1 Vrms by an LCR meter.

Results are shown in Table 1 below. It is to be noted that a reference of judgment of an inner electrode coverage in Table 1 is as follows.

Inner electrode coverage of 70% or more . . . very satisfactory level far exceeding a level of a conventional example Inner electrode coverage of 60% or more . . . satisfactory level exceeding a level of a conventional example Inner electrode coverage less than 60% . . . conventional example level

TABLE 1

| Sample No. | Dielectric layer forming ceramic main component composition | Ceramic particles in inner electrode layer forming paste (added amount) | Firing step First firing step |
|---|---|---|---|
| Example 1 | $BaTiO_3$ | $BaTiO_3$ (20 wt %) | 600° C., 2 Hr (5% $H_2$) |
| Example 2 | $BaTiO_3$ | $BaTiO_3$ (20 wt %) | 600° C., 2 Hr (0.5% $H_2$) |
| Example 3 | $BaTiO_3$ | $BaTiO_3$ (20 wt %) | 800° C., 2 Hr (5% $H_2$) |
| Example 4 | $BaTiO_3$ | $BaTiO_3$ (20 wt %) | 1000° C., 2 Hr (5% $H_2$) |
| Example 5 | $BaTiO_3$ | $BaTiO_3$ (20 wt %) | 260° C., 8 Hr (0.5% $H_2$) |
| Example 6 | $BaTiO_3$ | $BaTiO_3$ (20 wt %) | 260° C., 8 Hr (Air) |
| Example 7 | $BaTiO_3$ | $ZrO_2$ (10 wt %) | 600° C., 2 Hr (5% $H_2$) |
| Example 8 | $BaTiO_3$ | $BaSiO_3$ (10 wt %) | 600° C., 2 Hr (5% $H_2$) |
| Example 9 | $BaTiO_3$ | $CaTiO_3$ (10 wt %) | 600° C., 2 Hr (5% $H_2$) |
| Example 10 | $BaTiO_3$ | $BaTiO_3$ (5 wt %) | 600° C., 2 Hr (5% $H_2$) |
| Example 11 | $BaTiO_3$ | $BaTiO_3$ (10 wt %) | 600° C., 2 Hr (5% $H_2$) |
| Example 12 | $BaTiO_3$ | $BaTiO_3$ (15 wt %) | 600° C., 2 Hr (5% $H_2$) |
| Example 13 | $BaTiO_3$ | $BaTiO_3$ (25 wt %) | 600° C., 2 Hr (5% $H_2$) |
| Example 14 | $BaTiO_3$ | $BaTiO_3$ (20 wt %) | 600° C., 10 Hr (5% $H_2$) |
| Example 15 | $BaTiO_3$ | $BaTiO_3$ (20 wt %) | 700° C., 20 Hr (5% $H_2$) |
| Example 16 | $BaTiO_3$ | $BaTiO_3$ (20 wt %) | 600° C., 20 Hr (5% $H_2$) |
| Comparative Example 1 | $BaTiO_3$ | $BaTiO_3$ (20 wt %) | — |
| Comparative Example 2 | $BaTiO_3$ | — | 600° C., 2 Hr (5% $H_2$) |
| Comparative Example 3 | $BaTiO_3$ | $BaTiO_3$ (20 wt %) | 600° C., 2 Hr (5% $H_2$) |
| Comparative Example 4 | $BaTiO_3$ | $BaTiO_3$ (20 wt %) | 1080° C., 2 Hr (5% $H_2$) |

TABLE 1-continued

| | | | |
|---|---|---|---|
| Example 17 | $Ca_{0.7}Sr_{0.3}Ti_{0.97}Zr_{0.03}O_3$ | $Ca_{0.7}Sr_{0.3}Ti_{0.97}Zr_{0.03}O_3$ (20 wt %) | 600° C., 2 Hr (5% $H_2$) |
| Example 18 | $Ca_{0.7}Sr_{0.3}Ti_{0.97}Zr_{0.03}O_3$ | $BaTiO_3$ (20 wt %) | 600° C., 2 Hr (5% $H_2$) |
| Example 19 | $Ca_{0.7}Sr_{0.3}Ti_{0.97}Zr_{0.03}O_3$ | $MgTiO_3$ (10 wt %) | 600° C., 2 Hr (5% $H_2$) |
| Example 20 | $Ba_{0.97}Ca_{0.03}Ti_{0.8}Zr_{0.2}O_3$ | $Ba_{0.97}Ca_{0.03}Ti_{0.8}Zr_{0.2}O_3$ (20 wt %) | 600° C., 2 Hr (3% $H_2$) |
| Example 21 | $Ba_{0.97}Ca_{0.03}Ti_{0.8}Zr_{0.2}O_3$ | $BaTiO_3$ (20 wt %) | 600° C., 2 Hr (3% $H_2$) |
| Example 22 | $Ba_{0.97}Ca_{0.03}Ti_{0.8}Zr_{0.2}O_3$ | $BaSiO_3$ (20 wt %) | 600° C., 2 Hr (3% $H_2$) |
| Comparative Example 5 | $Ba_{0.97}Ca_{0.03}Ti_{0.8}Zr_{0.2}O_3$ | $Ba_{0.97}Ca_{0.03}Ti_{0.8}Zr_{0.2}O_3$ (20 wt %) | — |

| Sample No. | Firing step Second firing step | Content (%) of ceramic particles in electrode, indicated by sectional area | Inner electrode coverage (%) | Electrostatic capacity ($\times 10^{-7}$ F) |
|---|---|---|---|---|
| Example 1 | 1240° C., 2 Hr (5% $H_2$) | 2.54 | 77 | 1.40 |
| Example 2 | 1240° C., 2 Hr (5% $H_2$) | 2.25 | 75 | 1.35 |
| Example 3 | 1240° C., 2 Hr (5% $H_2$) | 1.75 | 70 | 1.30 |
| Example 4 | 1240° C., 2 Hr (5% $H_2$) | 1.05 | 62 | 1.10 |
| Example 5 | 1240° C., 2 Hr (5% $H_2$) | 1.04 | 62 | 1.10 |
| Example 6 | 1240° C., 2 Hr (5% $H_2$) | 1.11 | 60.7 | 1.07 |
| Example 7 | 1240° C., 2 Hr (5% $H_2$) | 2.10 | 73 | 1.25 |
| Example 8 | 1240° C., 2 Hr (5% $H_2$) | 2.20 | 72 | 1.30 |
| Example 9 | 1240° C., 2 Hr (5% $H_2$) | 2.60 | 75 | 1.30 |
| Example 10 | 1240° C., 2 Hr (5% $H_2$) | 2.00 | 70 | 1.28 |
| Example 11 | 1240° C., 2 Hr (5% $H_2$) | 2.10 | 74 | 1.33 |
| Example 12 | 1240° C., 2 Hr (5% $H_2$) | 2.30 | 74 | 1.34 |
| Example 13 | 1240° C., 2 Hr (5% $H_2$) | 2.70 | 72 | 1.32 |
| Example 14 | 1240° C., 2 Hr (5% $H_2$) | 2.70 | 82 | 1.45 |
| Example 15 | 1220° C., 2 Hr (5% $H_2$) | 17.6 | 90 | 1.30 |
| Example 16 | 1240° C., 2 Hr (5% $H_2$) | 8.00 | 88 | 1.60 |
| Comparative Example 1 | 1240° C., 2 Hr (5% $H_2$) | 0.80 | 59 | 1.00 |
| Comparative Example 2 | 1240° C., 2 Hr (5% $H_2$) | 0 | 48 | 0.70 |
| Comparative Example 3 | 1300° C., 2 Hr (5% $H_2$) | 0 | 40 | 0.10 |
| Comparative Example 4 | 1240° C., 2 Hr (5% $H_2$) | 0.50 | 57 | 0.90 |
| Example 17 | 1320° C., 2 Hr (5% $H_2$) | 3.00 | 85 | 0.0146 |
| Example 18 | 1320° C., 2 Hr (5% $H_2$) | 2.30 | 77 | 0.0132 |
| Example 19 | 1320° C., 2 Hr (5% $H_2$) | 2.10 | 76 | 0.0130 |
| Example 20 | 1260° C., 2 Hr (3% $H_2$) | 1.70 | 65 | 8.91 |
| Example 21 | 1260° C., 2 Hr (3% $H_2$) | 1.90 | 70 | 9.60 |
| Example 22 | 1260° C., 2 Hr (3% $H_2$) | 1.13 | 62 | 8.50 |
| Comparative Example 5 | 1260° C., 2 Hr (3% $H_2$) | 0.70 | 56 | 7.82 |

From the above-described result, the effect of the present invention is apparent. That is, the present invention relates to a multilayer ceramic capacitor having an element main body in which a dielectric layer and an inner electrode layer are alternately laminated. The inner electrode layer comprises a composite structure having an inner electrode main layer of a base metal, and ceramic particles buried in the inner electrode main layer. Therefore, the inner electrode layer is prevented from being interrupted by spheroidizing during the forming of the inner electrode layer, that is, drop of an electrode effective area can be suppressed, and high electrostatic capacity is obtained.

What is claimed is:

1. A multilayer ceramic capacitor comprising:
   an element main body in which a dielectric layer and an inner electrode layer are alternately laminated,
   the inner electrode layer comprising: a composite structure having an inner electrode main layer of a base metal; and particles consisting of ceramic particles buried in the inner electrode main layer,
   wherein an average particle diameter of the buried ceramic particles is ⅔ or less, not including zero, of a thickness of the inner electrode layer.

2. The multilayer ceramic capacitor according to claim 1, wherein a content of ceramic particles buried in the inner electrode main layer is in a range of 1.0 to 20% in terms of a sectional area.

3. A method of manufacturing the multilayer ceramic capacitor of claim 1, the method comprising:
   a step of preparing a dielectric layer forming paste for forming the dielectric layer;
   a step of preparing an inner electrode forming paste for forming an inner electrode;
   a step of forming a chip laminate which is a work in process of the element main body using the dielectric layer forming paste and the inner electrode forming paste; and
   a filing step of firing the chip laminate, the inner electrode forming paste containing base metal particles for forming an inner electrode main layer which functions as an electrode, and ceramic particles, the step of firing the chip laminate comprising: a first firing step performed at a firing temperature of 200 to 1000° C.; and a second firing step performed at a firing temperature higher than that of the first firing temperature after the first firing step.

4. The method of manufacturing the multilayer ceramic capacitor according to claim 3, wherein the content of the ceramic particles in the inner electrode forming paste is in a range of 0.1 to 40 wt % in conversion into a solid content with respect to that of a base metal.

5. The method of manufacturing the multilayer ceramic capacitor according to claim 3, wherein an average particle diameter of the base metal particles contained in the inner electrode forming paste is 0.4 µm or less (which does not include zero), and an average particle diameter of the ceramic particles is 0.1 µm or less (which does not include zero).

6. The method of manufacturing the multilayer ceramic capacitor according to claim 3, wherein the first forming step is performed in order to fire and to form the inner electrode layer while confining the ceramic particles added mainly to the inner electrode forming paste inside the inner electrode layer, and the second firing step is performed in order to fire and to form the dielectric layer while confining mainly the ceramic particles inside the inner electrode layer.

7. The method of manufacturing the multilayer ceramic capacitor according to claim 3, wherein the first firing step is performed in a reduction atmosphere.

8. The multilayer ceramic capacitor according to claim 1, wherein the thickness of the inner electrode main layer ranges from 0.5 to 5 µm.

9. The multilayer ceramic capacitor according to claim 1, wherein the thickness of the inner electrode main layer ranges from 0.5 to 2.5 µm.

10. The multilayer ceramic capacitor according to claim 1, wherein the ceramic particles comprise a titanium oxide material, a titanate complex oxide, or a mixture thereof.

11. The multilayer ceramic capacitor according to claim 10, wherein the titanium oxide material comprises NiO, CuO, $Mn_3O_4$, $Al_2O_3$, MgO, or $SiO_2$ in a range of 0.001 to 30% by weight.

12. The multilayer ceramic capacitor according to claim 10, wherein the titanate complex oxide is barium titanate.

13. The multilayer ceramic capacitor according to claim 12, wherein an atom ratio of Ba/Ti is in a range of 0.95 to 1.20.

14. The multilayer ceramic capacitor according to claim 13, wherein the barium titanate comprises MgO, CaO, $Mn_3O_4$, $Y_2O_3$, $V_2O_5$, ZnO, $ZrO_2$, $Nb_2O_5$, $Cr_2O_3$, $Fe_2O_3$, $P_2O_5$, SrO, $Na_2O$, $K_2O$, $Li_2O$, $SiO_2$, $WO_3$, or combinations thereof in a range of about 0.001 to 30% by weight.

15. The multilayer ceramic capacitor according to claim 1, wherein the ceramic particles comprise an oxide compound of a combination of one or two or more of Ba, Ca, Sr, Ti, Zr, Mg, Mn, V, Y, Cr, Nb, Si, K, Na, Li, B, Sc, Hf, Al, W, and a lanthanoid material.

* * * * *